(12) United States Patent
Bourbeau et al.

(10) Patent No.: US 8,841,884 B2
(45) Date of Patent: Sep. 23, 2014

(54) BATTERY CHARGING METHOD AND SYSTEM WITH THREE-STAGE TEMPERATURE-COMPENSATED CHARGE PROFILE

(75) Inventors: Frank J. Bourbeau, Santa Barbara, CA (US); James T. Matherly, Lompoc, CA (US)

(73) Assignee: Enerpro, Inc., Goleta, CA (US)

( * ) Notice: Subject to any disclaimer, the term of this patent is extended or adjusted under 35 U.S.C. 154(b) by 943 days.

(21) Appl. No.: 12/938,154

(22) Filed: Nov. 2, 2010

(65) Prior Publication Data

US 2011/0140672 A1 Jun. 16, 2011

(51) Int. Cl.
*H02J 7/00* (2006.01)

(52) U.S. Cl.
CPC ............ *H02J 7/0091* (2013.01); *H02J 7/0081* (2013.01)
USPC ............ 320/134; 320/132; 320/139; 320/162

(58) Field of Classification Search
USPC .......................................................... 320/139
See application file for complete search history.

(56) References Cited

U.S. PATENT DOCUMENTS

| | | | | |
|---|---|---|---|---|
| 4,392,101 A | | 7/1983 | Saar et al. ...................... 320/20 |
| 5,166,595 A | * | 11/1992 | Leverich ........................ 320/139 |
| 5,184,025 A | * | 2/1993 | McCurry et al. ................ 307/66 |
| 5,617,007 A | * | 4/1997 | Keidl et al. .................... 320/141 |
| 7,589,491 B2 | | 9/2009 | Brecht .......................... 320/104 |
| 7,906,864 B2 | * | 3/2011 | Ko .............................. 290/40 C |
| 2002/0171397 A1 | * | 11/2002 | Adrian et al. ................. 320/119 |
| 2007/0024246 A1 | * | 2/2007 | Flaugher ....................... 320/150 |
| 2008/0157592 A1 | * | 7/2008 | Bax et al. ...................... 307/10.1 |
| 2009/0218990 A1 | | 9/2009 | Johnson et al. |
| 2010/0033124 A1 | * | 2/2010 | Ngosi et al. ................... 320/101 |
| 2011/0043160 A1 | * | 2/2011 | Serban .......................... 320/101 |

OTHER PUBLICATIONS

Cummings. Gary et al., "Charge Batteries Safely in 15 Minutes by Detecting Voltage Inflection Points", EDN, Retrieved from the Internet: <http://www.accessmylibrary.com/article/print/1G1-16073463>, Sep. 1, 1994, 1 page.
"Xantrex Three-Stage Battery Charging". Retrieved from the Internet: <http://www.xantrex.com/power-products-support/document-downloads/product-type/battery-chargers.aspx>, Mar. 16, 2007, 2 pages.
"Solar Battery User Manual 605", Rolls Battery Engineering, Jan. 28, 1010, pp. 4-7.

* cited by examiner

*Primary Examiner* — Edward Tso
*Assistant Examiner* — Johali Torres Ruiz
(74) *Attorney, Agent, or Firm* — Koppel, Patrick, Heybl & Philpott

(57) ABSTRACT

A battery charging method and system with a temperature-compensated charge profile requires that, during a 'bulk stage', a regulated constant charge current is provided to the battery until the voltage across it increases to a predetermined 'absorption stage voltage limit', at which time charging transitions to an 'absorption stage'. During the absorption stage, a charge current is provided which maintains the voltage across the battery at the absorption stage voltage limit, until: 1) the charge current falls to a predetermined current threshold, 2) the charge delivered to the battery during the absorption stage reaches a predetermined charge threshold, or 3) the difference in charge between two successive intervals of equal duration becomes zero, at which time charging transitions to a 'float stage'. During the 'float stage', a regulated constant charge current is provided, such that the voltage across the battery varies with the temperature of the battery.

24 Claims, 3 Drawing Sheets

BATTERY CHARGING METHOD AND SYSTEM WITH THREE-STAGE TEMPERATURE-COMPENSATED CHARGE PROFILE

BACKGROUND OF THE INVENTION

1. Field of the Invention

This invention relates to the field of battery charging, and particularly to methods and systems for battery charging using a specified charge profile.

2. Description of the Related Art

Rechargeable lead-acid batteries are charged while their DC loads are disconnected, or while their loads are connected. The former would be represented by lift-truck and golf cart batteries, while the latter would include engine-powered road or rail vehicles. Battery chargers provide a current to and a voltage across the battery in accordance with a predetermined 'charge profile'. Freight and passenger locomotives typically use a 32 cell battery; a generator powered by the traction engine is used to recharge the battery after the engine is started and to keep the battery charged while simultaneously supplying the various DC auxiliary loads (lights, air conditioning, heating, computer, etc.) while the locomotive is in service.

EMD (Electro-Motive Diesel Division of Caterpillar Corp, formerly Electro-Motive Division of General Motors Corp.) locomotives manufactured prior to 2004, typified by Models SD40 through SD70, have a 74 V electrical system that is powered by a dedicated voltage-regulated "auxiliary generator". This may be a DC machine, or an AC machine with a diode rectifier. The charge profile is one-stage, with the DC generator or alternator/diode rectifier voltage regulated to a nominal 74 V by controlling the generator field current. Charge current is limited only by the battery and cable resistance, plus an added 50 mohm resistance. On EMD locomotives manufactured after 2004, such as the SD70ACe, the 74 V electrical systems are powered from a thyristor rectifier that is sourced with variable frequency/variable voltage AC power from a "companion alternator" that also provides AC power to drive the locomotive cooling fans and blowers. The charge profile provided by the thyristor rectifier is one-stage, with voltage regulated to a sometimes temperature-compensated 74 V. The total rectifier current is electronically limited to 425 A, but the battery current is limited by cable resistance and an added 50 mohm resistance.

A prototype locomotive made by the Progress Rail Division of Caterpillar was recently placed in service with a three-stage charger profile. In this charger, the first stage (referred to as the 'Bulk' stage) current is limited to 80 A, the second ('Absorption') stage voltage is limited to 78 V, and the third ('Float') stage current is limited to 5 A.

Conventionally, the transition between the Absorption and Float stages of a three-stage charger profile is made when the charging current has decreased to a fraction of the initial current. The transition threshold for the current must be high enough to ensure that the Absorption Stage charge current drops below the threshold under the worst-case combination of high temperature and degraded battery condition; if the transition threshold is too low or if the battery is so warm that the charge current never reaches the threshold, a condition known as 'thermal runaway' can occur which can destroy the battery. Because of the necessarily high transition current threshold, the Absorption Stage of conventional three-stage charge profiles will terminate before the all of the active material in the battery has been converted. If not all the material is converted (lead→lead sulfide), a sulfur compound will build up on the battery's plates, which degrades the battery's ability to accept charge.

One pending patent application (US 2009/0218990 to Johnson et al.), describes how the rate-of-change of current can be used to determine the time of the Absorption/Float Stage transition. This approach uses the difference of sampled current values divided by the time between samples to determine the di/dt of the charge current. This form of Absorption/Float Stage transition is used in golf cart and similar applications where the battery does not supply a load while being charged. However, using di/dt as an Absorption/Float Stage transition criterion can be problematic in the locomotive application, where live DC loads are switched on and off while the locomotive is in service. Owing to the finite response time of the voltage and current regulator circuits (typically 1.0 s for Auxiliary Alternator powered systems), the charging current and voltage are constant only when the load current is constant. When a high current load (for example, the cab heater) is switched on, the battery current momentarily changes from positive (charging) to negative (discharging). Switching the high current load off has the opposite result; battery current steps to a more positive value and then momentarily rebounds to a negative current. Since battery current is highly disturbed for a time after the load transient, the usefulness of using di/dt as a preventer of thermal runaway may be limited.

Several patents that are not directly related to 3-stage charging propose using the rate-of-change of battery voltage to control the charge profile; examples include U.S. Pat. No. 4,3923,101 to Saar et al. and U.S. Pat. No. 7,589,491 to Brecht. An article entitled "Charge Batteries Safely in 15 Minutes by Detecting Voltage Inflection Points", Cummings et al., EDN, Sep. 1, 1994, describes how the battery voltage dv/dt can be used to control charging. However, it is doubtful that using battery voltage dv/dt to control the charge profile would be possible if, as in the locomotive application, loads are connected and disconnected while the battery is being charged.

Other patents, such as U.S. Pat. Nos. 5,214,370 and 6,020,721, describe a means of reducing the possibility of thermal runaway through the use of sensors that adjust the battery voltage as a function of ambient or battery temperature. However, locomotive operators have found it problematic to measure the actual battery temperature with a delicate temperature probe in the rugged locomotive environment.

Use of a one-stage charge profile as described above can adversely affect the performance characteristics of a locomotive battery, such as the ability to support lighting and other loads when parked with the engine not running, or the ability to provide adequate (1000+ A) engine cranking current, especially at low ambient temperature. Locomotive operators report that batteries on diesel-electric locomotives that are shut down and restarted multiple times per day due to fuel costs or pollution regulations experience high cell failure rate, high water consumption and premature loss of capacity. Locomotives equipped with automatic engine start systems (AESS) are especially prone to battery problems. The short battery life associated with frequent engine starting can be traced to excessive current demand that occurs immediately after the engine starts, and insufficient voltage after the battery charger voltage reaches the typical 74 V setpoint. Excessive initial current creates localized thermal stress on the battery plates, and insufficient voltage results in incomplete conversion of the battery's active material during the time that the engine is running.

The charge current and battery voltage for a typical one-stage charge profile is illustrated in FIG. 1. Only the rectifier voltage (1) is regulated in the one-stage charger. Sufficient resistance is present in the battery circuit to limit the initial charging current to a level that allows the generator to produce enough power for the rectifier to reach its typical 74 V setpoint immediately after the engine starts. The initial battery current (2) is determined by the difference between the rectifier voltage and the battery's internal charge-dependent EMF divided by the DC circuit resistance. The latter consists of about 20 mohm of cable and battery internal resistance plus, in the case of EMD locomotives, an added 50 mohm resistor, for a total DC resistance of about 70 mohm. If the battery is highly discharged when the engine starts, a damaging current approaching 150 A can flow for a time after the engine starts. The 70 mohm of DC resistance creates a substantial voltage drop even as current decreases with charging time; for example, after an hour with the rectifier at 74 V, current might have decreased to 50 A. With 70 mohm of DC resistance, the battery voltage (3) will have risen to only 74−(50*0.07)=70.5 V. This is well below the manufacturers recommended value of 74 V at 25° C. (GNB Industrial Power Application Note, "KDZ-501 Charging Strategy"). As current decreases further, battery voltage increases and the current stabilizes at temperature dependent levels of (4) or (5) for low and high ambient temperatures, respectively. The risk of thermal runaway at high ambient temperature can be seen in the upward trending curve of current vs. time for the warm battery. Low ambient temperature causes the downward-trending current curve; a trend that indicates a loss of capacity. Battery manufacturers recommend using a battery temperature probe and associated regulator circuitry to decrease the charge voltage as a function of temperature. However, the delicate construction of the temperature probe and wiring cause locomotive operators to generally ignore the battery manufacturers' recommendations.

SUMMARY OF THE INVENTION

A battery charging method and system with a three-stage temperature-compensated charge profile is presented that overcomes the limitations of the one-stage and three-stage charging profiles discussed above.

The improved battery charging method, intended for use with flooded and valve-regulated lead acid batteries, creates a charge profile that:
  during a 'bulk stage', provides a fixed charge current of typically 20% of the battery's capacity until the battery voltage increases to a predetermined 'absorption stage voltage limit', at which time charging transitions to an 'absorption stage';
  during the 'absorption stage', provides a variable charge current to the battery which maintains the voltage across the battery at a predetermined absorption stage voltage limit of, for example, 2.44 V per cell, or 78 V for a 32 cell battery; and
  during a 'float stage', provides a constant charge current to the battery of typically 1% of capacity. The battery voltage automatically decreases or increases with temperature to maintain constant float current, effectively producing inherent temperature compensation without the need for a problematic temperature probe.

Proper timing of the absorption-to-float stage transition is critical; made too early and the battery is not completely charged, while thermal runaway is risked if made too late. The present method and system employ three criteria to ensure that this transition is made at the proper time.

These are:
1) the absorption stage charge current falls below a predetermined "absorption stage current threshold" value; or
2) the ampere-hours of charge delivered to the battery during the absorption stage reaches a predetermined "absorption stage charge threshold" value; or
3) the numerical time derivative of charge with respect to time reaches zero.

The improved charging method is particularly well-suited to use with flooded and valve-regulated lead-acid locomotive batteries that provide a low to moderate current to support critical locomotive functions (computer, radio, lights, etc.) when the engine is stopped, and a high current (1000+ A) to crank the engine. The improved method avoids excessive bulk stage current, provides the manufacturer's recommended absorption stage equalization voltage, and makes the transition to the float stage at a time that maximizes the conversion of active material while avoiding excessive water consumption.

Further features and advantages of the invention will be apparent to those skilled in the art from the following detailed description, taken together with the accompanying drawings.

DETAILED DESCRIPTION OF THE INVENTION

Figure 1:
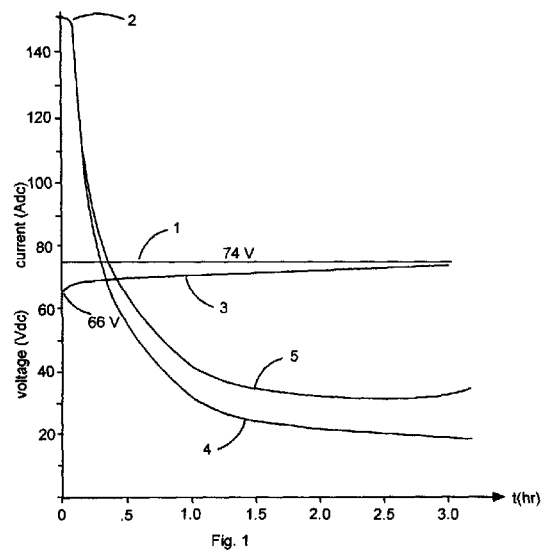
FIG. 1 depicts a known 1-stage charge profile as is used on locomotives made by EMD and others.
Figure 2:
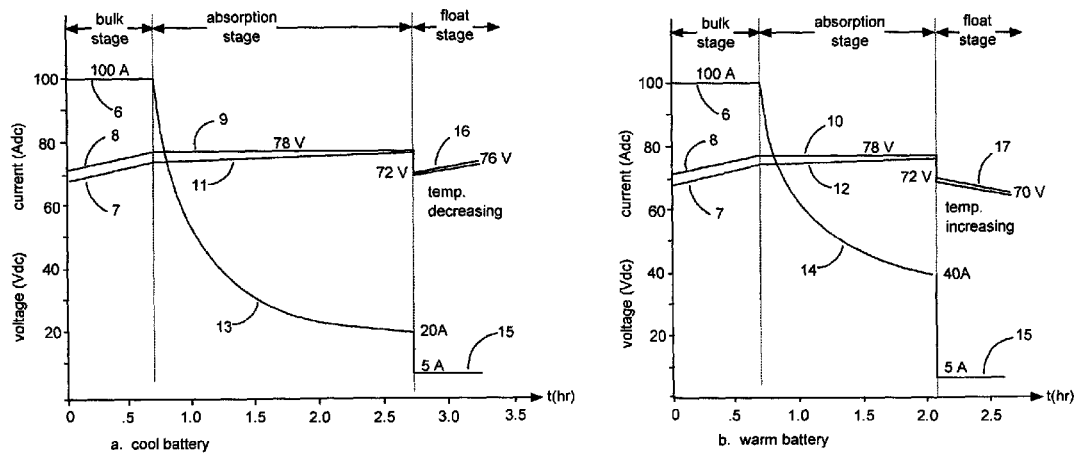
FIGS. 2a and 2b depict three-stage temperature-compensated charge profiles in accordance with the present invention, for a cool battery and a warm battery, respectively.

The present three-stage temperature-compensated charge profile, which is particularly well-suited for use with flooded or valve-regulated lead-acid batteries used in locomotives, is illustrated in FIGS. 2a and 2b, which depict charge voltage vs. time for a cool and a warm battery, respectively. The charge profile progresses through 'bulk', 'absorption' and 'float' stages. During the 'bulk stage', the charger regulates the charge current (6) to a predetermined percentage of the battery's amp-hour (A-h) capacity. Note that the various values and percentages provided in the following description and the accompanying figures are merely exemplary. For purposes of illustration, a 500 A-h battery suitable for use in a locomotive is assumed, and the various values and percentages specified in the description and figures are typical for such an application. Note, however, that different values and percentages might be appropriate, depending on the specific battery and application. Also note that, though a locomotive application is discussed herein, the present charge profile could also be used with batteries intended for other uses, such as golf carts or materials-handling vehicles such as lift trucks.

For example, for a 500 A-h battery, the charger might regulate the bulk stage charge current to 20% of capacity, or 100 A. Battery temperature has a negligible effect on the bulk stage current (6) and on the bulk stage battery voltage (7) or the bulk stage rectifier voltage (8). As a result, the bulk stage portion of the charge profile for a cool battery (FIG. 2a) is nearly identical to that of a warm battery (FIG. 2b). The constant bulk stage current causes the battery voltage to increase approximately linearly with time. The bulk stage rectifier voltage (8) exceeds the battery voltage (7) by the voltage drop in the cable between the rectifier and battery; this voltage differential decreases as the charge current falls. A cable resistance of 0.02 ohm is typical and, unlike prior art locomotive chargers, no added resistance is added to limit initial current, as the present charging system limits the initial current electronically. As a result, the rectifier voltage with 100 A bulk stage current is only about 100 A*0.02 ohm=2.0 V greater than the battery voltage, instead of ~6.0 V as may be found in the prior art.

The charging process transitions to the 'absorption stage' when the rectifier voltage (9) in FIG. 2a, 10 in FIG. 2b) reaches a predetermined voltage limit of, for example, 2.44 V per cell, or 78 V for a 32-cell locomotive battery. At this point, regulation changes from constant current at 100 A to constant rectifier voltage at 78 V. Due to the aforementioned cable voltage drop, the initial battery voltage is about 76 V, or 2.0 V less than the rectifier voltage. With a constant rectifier voltage, the absorption stage current (13) for the cool battery is assumed to decrease with a quasi-exponential decay from the 100 A initial current to a temperature-dependent steady-state current of about 20 A as given by:

$$I_{B\text{-}abs}(\text{cool}) = 85 * e^{-t/T} + 15,$$

where T is a charge and temperature-dependent time constant. The absorption stage current (14) for a warm battery (FIG. 2b) is assumed to decay to a steady-state current of about 40 A as given by:

$$I_{B\text{-}abs}(\text{warm}) = 60 * e^{-t/T} + 40.$$

The absorption stage voltage for the cool and warm batteries remains constant at 78 V. As a result of the decision process used to force the transition from the constant voltage absorption mode to the low current "float" mode, the duration of the absorption mode for the warm battery is less than that for the cool battery. This inherent temperature compensation makes the absorption stage charge approximately independent of temperature.

During the present profile's float stage, the charge current (15) is regulated to typically 1% of capacity, or 5 A for a 500 A-h battery. The float stage voltage (16) of FIG. 2a increases if the temperature of the cool battery decreases, as would be expected because of the reduced self-heating resulting from the reduced current. Likewise, FIG. 2b shows that an increase in the temperature of an already-warm battery results in a decrease in float stage voltage (17). These float voltage changes are the same as would result from perfectly implemented temperature compensation, but without the problematic temperature probe.

The present battery charging system and method forces a transition from the absorption mode to the float mode when any of the following conditions occurs:
1) the current decreases to predetermined "absorption stage current threshold" value, or
2) the charge increases to a predetermined "absorption stage charge threshold" value, or
3) the time derivative of charge decreases to zero.

In a typical application, the predetermined absorption stage current threshold value is about 6% of battery capacity—e.g., ~30 A for a 500 A-h battery, and the predetermined absorption stage charge threshold value is about 10% of battery capacity—e.g., 50 A-h for a 500 A-h battery. When one of these three conditions is detected, a transition from the absorption mode to the float mode is triggered: the current command is reduced, and the system transitions from voltage regulation at 78 V to low float stage current regulation.

Figure 3:
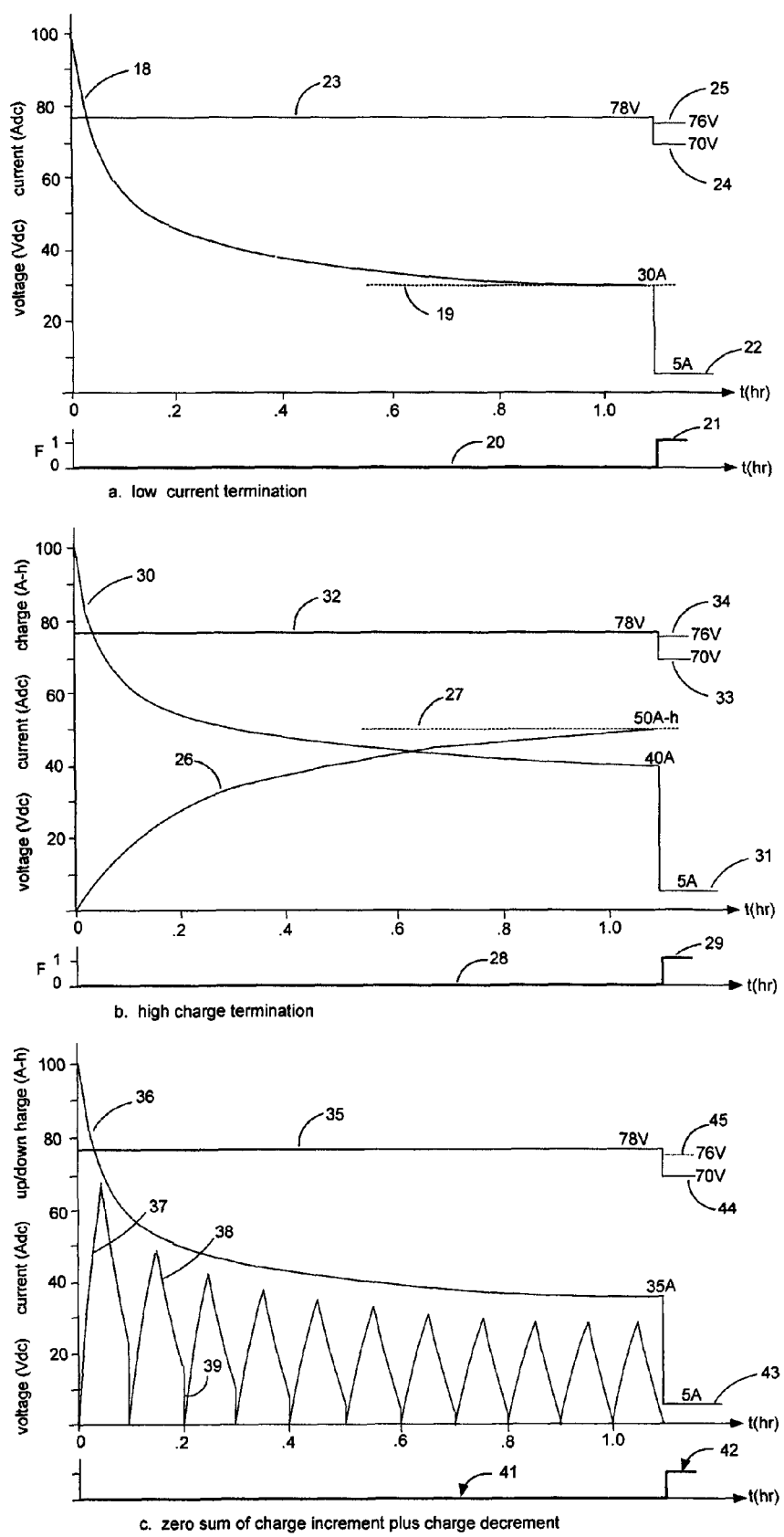
FIGS. 3a-3c are graphs illustrating the three possible absorption-to-float stage transition mechanisms in accordance with the present invention.

Low Current Absorption/Float Transition Profile FIG. 3a shows absorption stage termination when the stage current (18) drops below an absorption stage current threshold (19) of 6% of capacity, or 30 A for a 500 A-h battery. Current decreases rapidly at the beginning of the stage and then levels off as it approaches the 30 A threshold. This would be detected with, for example, a comparator that receives the predetermined absorption stage current threshold value at an input; when the charge current falls below that value, a float command 'F' changes from logic 0 (20) to logic 1 (21). This triggers a transition to the float stage, during which the current steps down to a regulated value such as 5 A (22), or 1% of capacity for the 500 A-h battery in this example. In response, the battery voltage drops from a regulated 78 V (23) to a temperature dependent voltage. Depending on individual battery characteristics, this voltage could be, for example, 70 V for a warm battery (24), or 76 V for a cool battery (25).

High Charge Absorption/Float Stage Transition Profile FIG. 3b shows the absorption-to-float stage transition when the charge (26) increases to a 50 A-h absorption stage charge threshold (27), which causes the float command F to change from 0 (28) to 1 (29). This triggers a transition to the float stage, during which current drops from the unregulated absorption stage current (30) to a regulated 5 A (31), with voltage dropping from a regulated 78 V (32) to a temperature-dependent voltage typically in the range of 70 V (33) to 76 V (34). The absorption-to-float stage transition takes place at about 40 A in this example, which is typical for a warm battery. Because of the battery's internal heat, it is possible that the current would never have fallen to 30 A, and the battery would have gone into thermal runaway had the absorption stage not been terminated by this mechanism.

Zero Delta Charge Absorption/Float Stage Transition Profile FIG. 3c shows the absorption stage voltage and current, a charge increment signal (37), a charge decrement signal (38), the difference between each charge increment and decrement (39), and the float stage command F. Here, when the positive and negative charge increments are in balance—i.e., when the difference between the charge increment and decrement reaches zero—float command F changes from logic 0 (41) to logic 1 (42) to trigger the transition to the float stage. As with the two aforementioned absorption/float stage transition methods, current then steps down to a regulated 5 A (43), or 1% of capacity, and the battery voltage drops from a regulated 78 V (35) to a temperature-dependent voltage typically in the range of 70 V (44) to 76 V (45). Current is shown as about 35 A at the zero-rate-of-change of charge transition. Thermal runaway might have occurred if the absorption stage had not been terminated by this mechanism.

Figure 4:
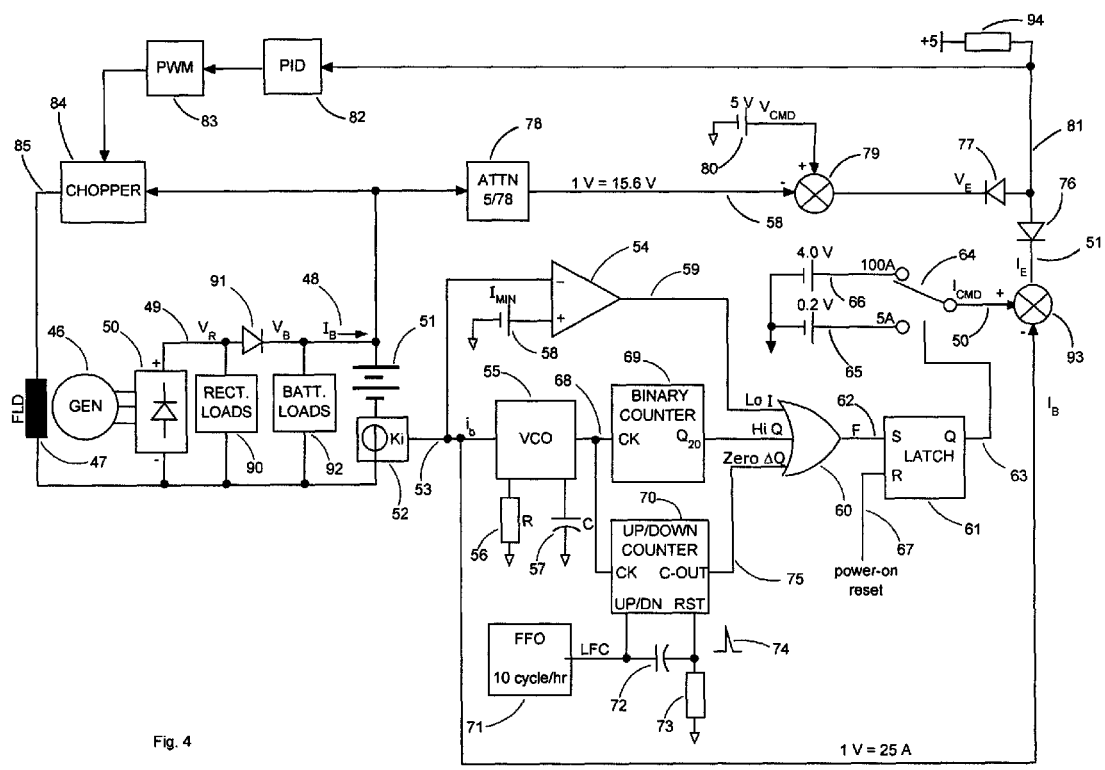
FIG. 4 is a block diagram of a battery charging system in accordance with the present invention.

Functional Block Diagram FIG. 4 depicts a block diagram of one possible embodiment of a typical locomotive generator (46) powered battery charger in which the charger's power electronics circuitry adjusts the current in the generator's field winding (47) to modulate the steady-state battery current $I_B$ (48) and the output voltage $V_R$ (49) of diode rectifier (50) as required to produce the three-stage charge profile. In this arrangement, regulating the rectifier voltage is equivalent to regulating the battery voltage because of the small (<2.0 V) voltage drop across diode (91) and the battery cable resistance at the end of the Absorption Stage.

In addition to the battery, at least two other loads are typically connected to the rectifier. Rectifier loads (90) are powered only when the engine is running; diode (91) prevents the battery from discharging into these loads. Battery loads (92) are powered by the battery when the engine is not running. When the engine is running, the average power to the battery loads is supplied from the generator through the rectifier, with the battery supplying transient power to the battery loads when the loads are switched on and off. The battery acts as a low pass filter to prevent high amplitude short duration rectifier load transients from disturbing the voltage on the battery loads.

For clarity of explanation, the charger signal processing is shown as a combination of analog and digital logic circuitry; the actual circuit would typically be implemented with an embedded microprocessor or an application specific integrated circuit (ASIC).

In FIG. 4, an analog voltage signal representing battery charging current is processed by three parallel circuits, each of which produces a logic signal, that triggers the absorption-to-float stage transition. Each circuit is described below.

Low Current Absorption/Float Transition Circuit Battery current is sensed by a current transducer (52), which is preferably a non-contacting hall effect device. The current transducer output signal $i_b$, (53), typically scaled at 0.04 V/A, is applied to the inverting input of a voltage comparator (54), the input of a voltage-controlled oscillator (VCO) (55), and an input to a signal summer (93). The constant of proportionality between the voltage at the VCO's input (53) and the frequency at the VCO's output (68) is set by the product of a resistor (56) and a capacitor (57) connected to the VCO.

The non-inverting input of voltage comparator (54) is connected to a reference voltage (58) that establishes the absorption stage current threshold ($I_{MIN}$) used for the Low Current Absorption/Float Transition mechanism. The magnitude of the reference voltage is selected such that the comparator output (59) changes from logic 0 to logic 1 when the absorption stage charge current falls below, for example, about 6% of capacity. For a 500 A-h battery, this transition level would be 0.06*500=30 A. For a current transducer having a gain Ki of 0.04 V/A, this transition level would require that the comparator reference voltage be −0.04*30=1.2 V. The output of the comparator is applied to the "LoI" input of a 3-input OR gate (60). If the comparator output changes from logic 0 to logic 1, the output of the OR gate will also change from 0 to 1. The OR gate output is connected to the set input of a latch (61). A positive output pulse from the OR gate's output (62) resulting from a change-of-state of the current comparator output will set the latch output (63) to logic 1. This will change the state of a current command switch (64) so that it transmits a 5 A float stage current reference (65) instead of a 100 A current reference (66) to signal summer (93).

Latch (61) remains set and the charger remains in the float stage until charger control power is re-applied. At this time, a power-on reset pulse (67) is applied to the latch's reset input; this causes latch output (63) to go to logic 0, which places current command switch 64 back in the 100 A bulk stage position.

High Charge Absorption/Float Transition Circuit VCO (55) responds to current signal (53), by producing an output signal (68) with a frequency that is proportional to charge current. The VCO is suitably an Analog Devices AD654, which has an output frequency given by:

$$F=V/(10*R*C),$$

where V is the output (53) of current transducer (52) with its typical gain (Ki) of 0.04 V/A. As a result, the VCO output frequency as a function of charge current is given by:

$$F=0.04*I_B/(10*R*C)=I_B/(250*R*C).$$

The VCO signal serves as a clock signal for a binary counter (69). A 0 to 1 transition of, for example, the $Q_{20}$ output of the binary counter indicates that the predetermined absorption stage charge threshold value has been reached. It can be shown that the amount of absorption stage charge ($Q_{ABS}$) that has been accumulated when the $Q_{20}$ output of the binary counter goes to the logic 1 state is given by:

$$Q_{ABS}=(2^{19}*R*C)/(360*Ki).$$

For typical values such as R=4020 ohm, C=0.33 μF, and Ki=0.04 V/A, the charge indicated by the $Q_{20}$ transition is 48.3 A-h. The $Q_{20}$ output signal, designated as "HiQ", is provided to an input of 3-input OR gate 60, then to latch 61 and switch 64 to change the current reference from 100 A to 5 A.

Zero Change-of-Charge Transition Circuit The output of VCO (55) is also applied to the clock input of an up/down counter (70) that has, for example, 12 counting stages. The low frequency clock output of a fixed frequency oscillator (FFO) (71) is applied to the up/dn input of the up/down counter. The FFO has a frequency of, for example, 10 cycles per hour—equivalent to a period of 6.0 minutes; this establishes successive fixed time intervals of 3 minutes each, with the FFO's output at logic 0 for 3 minutes and at logic 1 for 3 minutes. The LFC output of the FFO is also differentiated by a capacitor (72) and a resistor (73) to form a short duration (1.0 ms) positive-going pulse (74) that is applied to the RST input of up/down counter (70). This pulse serves to reset the up/down counter to zero at the beginning of the first fixed time interval. Once reset, the counter starts counting up at a rate dependent on the magnitude of battery current thereby integrating the current to form a positive charge segment during the 3.0 minutes that the FFO output is at logic 1. During the next 3.0 minute half cycle with the FFO output at logic 0, the up/down counter counts down, effectively calculating a negative charge segment. At the end of the down count, the binary word represented by the counter's 12 outputs represents the charge difference between successive integrations of the current signal. When the down-count approximately equals the up-count, charge is no longer decreasing with time. At this point, the up/down counter issues a CARRY-OUT (C-OUT) signal (75), which is applied to the Zero ΔQ input of 3-input OR gate (60). The CARRY-OUT signal is passed through the OR gate to set the latch and trigger the absorption-to-float stage transition.

Since current is the derivative of charge, taking the difference of successive current integrations performed by up/down counter (70) forms a sample-data representation of the battery current with one important difference: when the down-count is approximately equal to the up-count, the current component representing the conversion of the battery's active material becomes approximately zero, and all of the charger's output power is going into electrolysis and ohmic heating. When the conversion of active material is complete, the transition to the float stage should be forced if this has not already occurred due to a low absorption stage current or high charge condition. The possibility of thermal runaway is eliminated if the transition to the low constant current float stage is made around the time that all electrical power into the battery is going into electrolysis or ohmic heating.

Current or Voltage Regulation Signal summer (93) produces a current error signal $I_E$ (51) that is applied to the cathode of an OR'ing diode (76) which, together with a second OR'ing diode (77) and pull-up resistor (94), forms an error signal selector switch. Similarly, the output voltage of rectifier (50), attenuated by a 5/78 ratio attenuator (78), is applied to the negative input of a voltage feedback summing element (79), while a 5 V reference voltage (80) is applied to the summing element's positive input. The output of this summing element is a voltage error signal $V_E$ that is applied to the cathode of second OR'ing diode (77). The signal (81) at the common anode connection of the OR'ing diodes is applied to a proportional-integral-derivative (PID) transfer function (82). The PID output is applied to a pulse-width modulator (83), which controls the duty cycle of a chopper switch (84). The generator field voltage (85) is the average output voltage of the chopper, which is equal to the product of the rectifier output voltage (49) and the PWM duty cycle. Because of the integral term of the PID transfer function, the steady-state voltage at the common anode connection (81) of the OR'ing diodes is zero. This means that the larger of the two error signals ($I_E$ and $V_E$) controls the duty cycle. For example, if the attenuated rectifier voltage is less than 5 V, the voltage error at the output of the voltage summing element will be greater than zero and OR'ing diode (77) will block. Since the voltage at common anode connection (81) must be zero, this forces the condition that the steady-state feedback signal from the battery current sensor must be equal to the 4 V (100 A) current reference or the 0.20 V (5 A) current reference, depending on whether the charger is in the bulk stage or float stage. Similarly, it can be shown that the rectifier output voltage must be in voltage regulation at 78 V if the battery current is less than 100 A or 5 A, depending on whether the charger is in the bulk stage or float stage.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of charging a rechargeable battery, comprising:
   providing, during a 'bulk stage', a regulated charge current to said battery until the voltage across said battery increases to a predetermined 'absorption stage voltage limit' at which time charging transitions to an 'absorption stage';
   providing, during said 'absorption stage', a charge current to said battery which maintains the voltage across said battery at said predetermined 'absorption stage voltage limit';
   determining when a first condition occurs, said first condition being when said charge current falls to a predetermined 'absorption stage current threshold' value;
   determining when a second condition occurs, said second condition being when the charge in ampere-hours delivered to said battery during said absorption stage rises to a predetermined 'absorption stage charge threshold' value;
   determining when a third condition occurs, said third condition being when the difference in charge between two successive fixed time intervals of equal duration becomes approximately zero;
   transitioning charging to a 'float stage' when any of said three conditions are met; and
   providing, during said 'float stage', a constant charge current to said battery such that the voltage across said battery varies with the temperature of said battery.

2. The method of claim 1, wherein said regulated charge current provided during said bulk stage is a constant current.

3. The method of claim 2, wherein said constant current provided during said bulk stage is a predetermined percentage of said battery's amp-hour capacity.

4. The method of claim 2, wherein said constant current provided during said bulk stage is approximately 20% of said battery's amp-hour capacity.

5. The method of claim 1, wherein said predetermined absorption stage current threshold value is a predetermined percentage of said battery's amp-hour capacity.

6. The method of claim 5, wherein said predetermined absorption stage current threshold value is approximately 6% of said battery's amp-hour capacity.

7. The method of claim 1, wherein said predetermined absorption stage charge threshold value is a predetermined percentage of said battery's amp-hour capacity.

8. The method of claim 7, wherein said predetermined absorption stage charge threshold value is approximately 10% of said battery's amp-hour capacity.

9. The method of claim 1, wherein said constant current provided during said float stage is a predetermined percentage of said battery's amp-hour capacity.

10. The method of claim 9, wherein said constant current provided during said float stage is approximately 1% of said battery's amp-hour capacity.

11. The method of claim 1, wherein said battery is a flooded lead-acid battery.

12. The method of claim 1, wherein said battery is a valve-regulated lead-acid battery.

13. The method of claim 1, wherein said battery is intended for use in a locomotive.

14. The method of claim 1, wherein said battery is intended for use in a materials-handling vehicle or a golf cart.

15. A battery charging system, comprising:
   circuitry arranged to provide a charge current to and a voltage across a battery to be charged; and
   a controller arranged to operate said circuitry such that:
      during a 'bulk stage', said circuitry provides a regulated charge current to said battery until the voltage across said battery increases to a predetermined 'absorption stage voltage limit' at which time charging transitions to an 'absorption stage';
      during said 'absorption stage', said circuitry provides a charge current to said battery which maintains the voltage across said battery at said predetermined 'absorption stage voltage limit',
      said controller arranged to detect at least three conditions, a first condition being when said charge current falls to a predetermined 'absorption stage current threshold' value, a second condition being when the amp-hour product delivered to said battery during said absorption stage reaches a predetermined 'absorption stage charge threshold' value, a third condition being when the difference in charge between two successive fixed time intervals of equal duration becomes approximately zero, said controller further arranged to transition charging to a 'float stage' when any of said first, second or third conditions are detected; and
      during said 'float stage', said circuitry provides a constant charge current to said battery such that the voltage across said battery varies with the temperature of said battery.

16. The battery charging system of claim 15, wherein said circuitry comprises:
   a generator; and
   a rectifier arranged to receive and rectify an AC voltage from said generator and to provide said rectified voltage to said battery.

17. The battery charging system of claim 16, wherein said generator comprises a companion alternator and said rectifier is a thyristor rectifier.

18. The battery charging system of claim 16, wherein said generator and rectifier comprise a field current-controlled auxiliary generator and a diode rectifier, or a companion alternator and a thyristor rectifier.

19. The battery charging system of claim 15, wherein said controller comprises a microprocessor.

20. The battery charging system of claim 15, wherein said controller comprises an application specific integrated circuit (ASIC).

21. The battery charging system of claim 15, further comprising a current transducer connected in series with said battery to sense the current in said battery and to provide an output voltage that varies with said sensed current.

22. The battery charging system of claim 21, further comprising a comparator connected to receive said current transducer output and a reference voltage at respective inputs and to toggle an output when said charge current has fallen to said predetermined absorption stage current threshold value, said system arranged to transition from said absorption stage to said float stage when the output of said comparator toggles.

23. The battery charging system of claim 21, further comprising:
  a voltage-controlled oscillator (VCO) connected to receive said current transducer output at an input and to provide an output having a frequency that varies with said current transducer output; and
  a binary counter having a clock input that is connected to the output of said VCO;
  said system arranged to transition from said absorption stage to said float stage when the count indicated by said counter indicates that the amp-hour product delivered to said battery during said absorption stage has reached said predetermined absorption stage charge threshold value.

24. The battery charging system of claim 21, further comprising:
  a voltage-controlled oscillator (VCO) connected to receive said current transducer output at an input and to provide an output having a frequency that varies with said current transducer output;
  an up/down counter having a clock input which is connected to the output of said VCO and an up/dn input; and
  a fixed frequency oscillator (FFO) having an output which toggles periodically between logic 0 and logic 1 states, remaining in each state for fixed time intervals of equal duration, said FFO output applied to said up/dn input, said up/down counter arranged to count up or down in response to said VCO output based on the state of said FFO output;
  said system arranged to transition from said absorption stage to said float stage when said up/down counter indicates that the difference in charge between two successive ones of said fixed time intervals is approximately zero.

* * * * *